(12) United States Patent
Jain et al.

(10) Patent No.: US 9,215,177 B2
(45) Date of Patent: Dec. 15, 2015

(54) SYSTEM AND METHOD FOR DISTRIBUTION OF POLICY ENFORCEMENT POINT

(71) Applicant: VMware, Inc., Palo Alto, CA (US)

(72) Inventors: Jayant Jain, Palo Alto, CA (US);
Anirban Sengupta, Palo Alto, CA (US);
Debashis Basak, San Jose, CA (US);
Serge Maskalik, Palo Alto, CA (US);
Weiqing Wu, Cupertino, CA (US);
Aravind Srinivasan, Shivajinagar (IN);
Todd Sabin, Palo Alto, CA (US)

(73) Assignee: WMware, Inc., Palo Alto, CA (US)

( * ) Notice: Subject to any disclaimer, the term of this patent is extended or adjusted under 35 U.S.C. 154(b) by 271 days.

(21) Appl. No.: 13/925,483

(22) Filed: Jun. 24, 2013

(65) Prior Publication Data

US 2014/0376367 A1    Dec. 25, 2014

(51) Int. Cl.
*H04L 29/12* (2006.01)
*H04L 29/06* (2006.01)
*H04L 12/813* (2013.01)
*H04L 29/08* (2006.01)

(52) U.S. Cl.
CPC ............ *H04L 47/20* (2013.01); *H04L 63/0218* (2013.01); *H04L 63/0263* (2013.01); *H04L 67/1002* (2013.01); *H04L 61/2514* (2013.01)

(58) Field of Classification Search
None
See application file for complete search history.

(56) References Cited

U.S. PATENT DOCUMENTS

2006/0037071 A1*   2/2006   Rao et al. .................... 726/13

FOREIGN PATENT DOCUMENTS

EP   1804465 A1   7/2007

OTHER PUBLICATIONS

Patent Cooperation Treaty, International Application No. PCT/US2014/043956, Notification of Transmittal of the International Search Report and the Written Opinion of the International Searching Authority, or the Declaration; International Searching Report mailed Oct. 30, 2014; Written Opinion of the International Searching Authority, 11 pages.
A.D. Keromytis et al., "The Strongman Architecture", Proceedings DARPA Information Survivability Conference and Exposition, Jan. 1, 2003, pp. 178-188, XP055147295.

* cited by examiner

*Primary Examiner* — Hoon J Chung

(57) ABSTRACT

The disclosure herein describes an edge device of a network for distributed policy enforcement. During operation, the edge device receives an initial packet for an outgoing traffic flow, and identifies a policy being triggered by the initial packet. The edge device performs a reverse lookup to identify at least an intermediate node that is previously traversed by the initial packet and traffic parameters associated with the initial packet at the identified intermediate node. The edge device translates the policy based on the traffic parameters at the intermediate node, and forwards the translated policy to the intermediate node, thus facilitating the intermediate node in applying the policy to the traffic flow.

20 Claims, 6 Drawing Sheets

SYSTEM AND METHOD FOR DISTRIBUTION OF POLICY ENFORCEMENT POINT

BACKGROUND

In a multi-tenant datacenter environment, typically an edge appliance, such as an edge router, is deployed per tenant to handle all the "North-South" (in and out of the tenant network) traffic. Note that a tenant is any application that needs its own secure and exclusive virtual computing environment. The edge appliance also serves as the main Policy Enforcement Point (PEP) for the tenant network. Traditional PEP services typically provided by this edge appliance include firewall and network address translation (NAT). Due to the sheer amount of traffic processing coupled with the policy enforcement responsibility, this edge appliance often becomes a bottleneck for the network and hampers scalability. Moreover, by the time egress traffic from the tenant side reaches the edge, it may have traversed multiple intermediate routers and service nodes in the datacenter, both virtual and physical, which may have altered the traffic parameters, such as source/destination address or port. As a result, implementing multiple PEP points and distributing the edge policy to these multiple PEP points can be an issue.

SUMMARY

The disclosure herein describes an edge device of a network for distributed policy enforcement. During operation, the edge device receives an initial packet for an outgoing traffic flow, and identifies a policy being triggered by the initial packet. The edge device performs a reverse lookup to identify at least an intermediate node that is previously traversed by the initial packet and traffic parameters associated with the initial packet at the identified intermediate node. The edge device translates the policy based on the traffic parameters at the intermediate node, and forwards the translated policy to the intermediate node, thus facilitating the intermediate node in applying the policy to the traffic flow.

BRIEF DESCRIPTION OF FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The present disclosure describes a system and a method that dynamically distribute edge policies to multiple Policy Enforcement Point (PEP) nodes within a tenant in a datacenter. More specifically, when a traffic flow that traverses one or more network address translation (NAT) layers is initiated, a reverse NAT lookup and/or routing lookup is performed, and the edge policy is pushed up to the PEP node that is closest to the origination or destination of the traffic flow.

Figure 1:
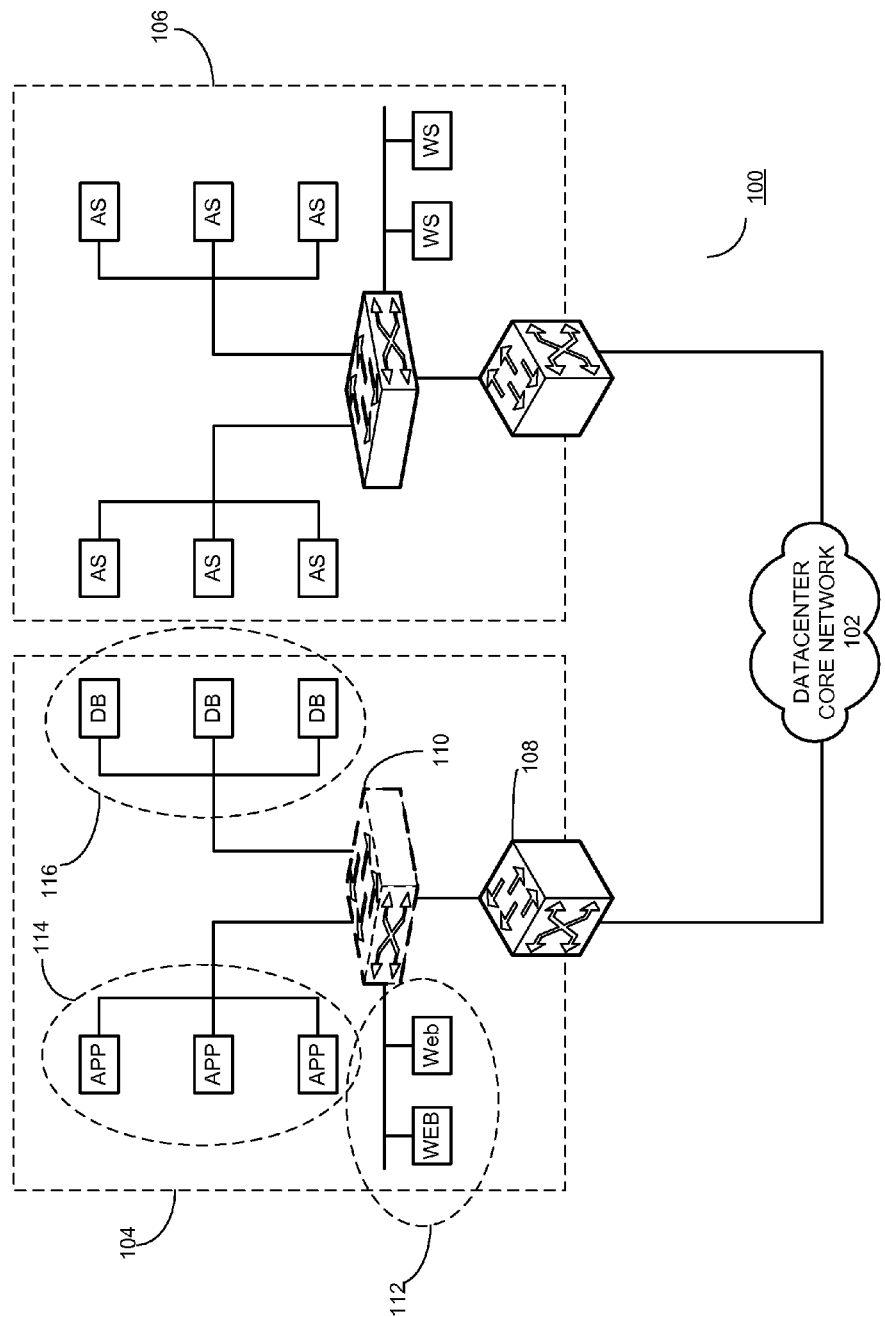
FIG. 1 presents a diagram illustrating an exemplary multi-tenant datacenter.

FIG. 1 presents a diagram illustrating an exemplary multi-tenant datacenter. In FIG. 1, multi-tenant datacenter 100 includes datacenter core network 102 and a number of tenant networks, such as a tenant network 104 and a tenant network 106. Each tenant network includes an edge appliance 108 (which can be, for example, an IP router), a virtual edge device 110 (which can be, for example, a virtual switch if the services are provided by virtual machines), and three functional tiers, including a web tier 112 that includes a number of web servers, an application tier 114 that includes a number of application servers, and a database tier 116 that includes a number of database servers.

In a conventional system, the edge appliance, such as edge appliance 108, is the sole PEP node and is responsible for enforcing various edge policies, such as security policies, for the entire tenant network. For example, the edge appliance can provide firewall service and prevent intrusions to the tenant network. On the other hand, in a virtualized environment where services are provides by virtual machines, a virtual edge appliance, such as virtual edge device 110, can provide server load balancing services. Both the firewall and the load balancing involve NAT, where the IP address information in the IP headers is modified. As a result, before an incoming packet arrives at a destination server or before an outgoing packet arrives at the edge appliance, the IP address information may have been modified multiple times. Note that various types of NAT implementations may be possible, including but not limited to: one-to-many NAT, one-to-one NAT, etc.

For example, when a packet requesting a web service arrives at edge appliance 108 from datacenter core 102, its IP header may indicate its destination IP address as 192.168.xx.xx, which is the IP address for web tier 112 known by datacenter core 102. Note that such an address does not reflect the true IP address of any web servers within web tier 112. To map this address to a server within web tier 112, edge appliance 108 performs a NAT lookup to identify the internal IP address of a web server. Note that, because web tier 112 often includes a server farm (or a group of web servers), the NAT lookup may result in the internal IP address of a load balancer. As a result of the NAT lookup, edge appliance 108 modifies the IP header of the packet by replacing its destination IP address with the internal IP address (such as 10.10.1.x) of the load balancer located at virtual edge 110, and forwards the packet to the load balancer. The load balancer performs server load balancing before forwarding the packet to a particular web server. As a result of the load balancing, the destination IP address of the packet is modified again to reflect the internal IP address (such as 10.10.2.x) of that particular web server before the packet is forwarded to that particular web server. In addition, if the web service request requires a call to an application server, the web server receiving the request needs to initiate an application request or forward the packet to one of the application servers. Similarly, the application servers are behind a load balancer that is responsible for balancing the load among all application servers, and the destination IP address of the packet will be modified to reflect the internal IP address (such as 10.10.3.x) of the application-server load balancer. Once the packet arrives at the application-server load balancer, its destination IP address will be modified again by the load balancer to that of a selected application server. A similar process may also happen if a database call is needed. As one can see, this tiered architecture ensures the segregation among servers that provide different functions, and applying NAT at the load balancer (located at virtual edge 110) makes it possible to maintain consistent addressing of the multi-tier communications, including communications between web tier 112 and application tier 114, and communications between application tier 114 and database tier 116. In other words, web servers within web tier 112 need not be aware of any changes (such as swapping of servers or updating the address of the load balancer) in application tier 114) within application tier 114. Traffic flow from web tier 112 will always be addressed to a fixed address and then be mapped (through NAT) to the updated address of the load balancer. However, this configuration also requires several layers of NAT, which makes it difficult to implement distributed PEP. For example, if an intermediate node, such as a web server, attempts to enforce a firewall rule that denies all packets with a destination address of 192.168.10.10, the web server needs to first identify incoming packets with such a destination address. However, due to the existence of the several NAT layers, when these packets arrive at the web server, their destination addresses have been modified multiple times and no longer read 192.168.10.10. As a result, the web server cannot identify these packets; neither can it enforce the firewall rule.

In the outbound direction where a packet originates within the tenant network (such as network 104) and destined to a network node outside of the tenant network, the address information in the IP header is also modified multiple times as the packet traverses over the multiple NATs. More specifically, the source address and/or port of the packet changes each time the packet traverses a NAT. For example, when a web server responds to a web request, the response packet needs to traverse at least two NATs, the web server load balancer and the NAT at the edge of the tenant network. As a result, the source address and/or the port number of the response packet are modified at least twice before they reach edge appliance 108.

The traffic throughput in and out of a tenant network may be limited by the policy enforcement ability of the edge appliance (such as edge appliance 108). Even though today's edge appliances are often equipped with 10 Gigabit Ethernet (10 GbE) network adaptors, enforcing a policy (such as firewall policy) on every incoming packet often results in reduced traffic throughput (to about 1 GbE). Hence, it is desirable to implement distributed PEP, which offloads the processing of the edge policies to multiple PEP nodes within the tenant network. In some embodiments, the edge policy is enforced at a PEP node that is closest to the traffic destination/origination point within the tenant network. Given the dynamic nature of traffic and the various network elements (such as load balancers or switches that perform NAT) that may alter the traffic parameters (such as source/destination address and port), expressions of the edge policy (such as firewall rules, which are often implemented using IP-address/port based traffic filters) also need to be dynamically adjusted.

Figure 2:
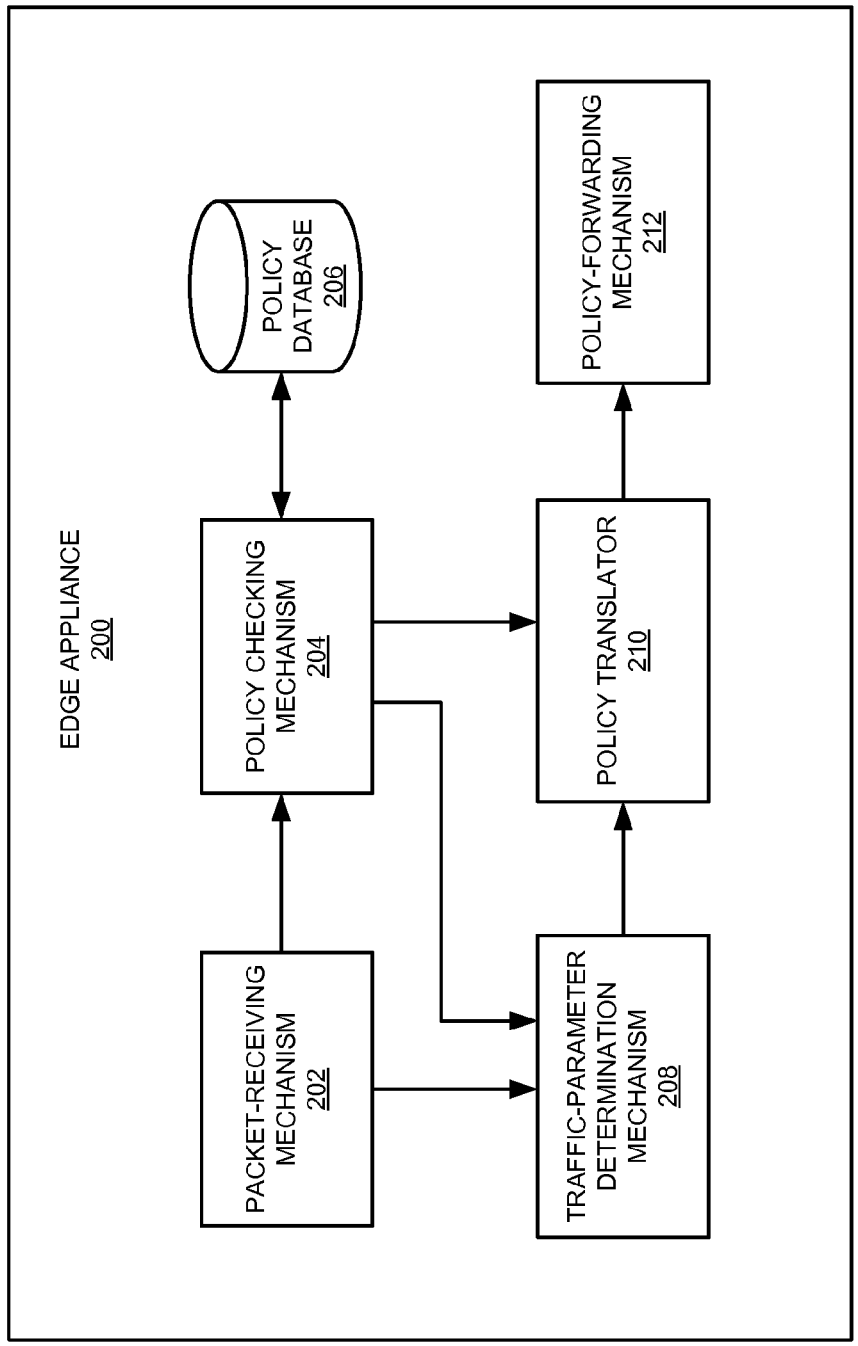
FIG. 2 presents a diagram illustrating an exemplary architecture of an edge appliance.

FIG. 2 presents a diagram illustrating an exemplary architecture of an edge appliance. In FIG. 2, edge appliance 200 includes a packet-receiving mechanism 202, a policy checking mechanism 204, a policy database 206, a traffic-parameter determination mechanism 208, a policy translator 210, and a policy-forwarding mechanism 212.

Packet-receiving mechanism 202 is responsible for receiving packets, either from the datacenter core or from nodes within the tenant network. Note that once an initial packet for a packet flow is received, packet-receiving mechanism 202 may extract current traffic parameters from the initial packet and forward the current traffic parameters to policy checking mechanism 204, which is responsible for checking whether the current traffic parameters trigger a policy, such as a firewall rule, and identifying the corresponding triggered policy. More specifically, policy checking mechanism 204 may interact with policy database 206, which stores various types of edge policies, in order to determine whether the incoming/outgoing traffic flow triggers a policy. For example, a firewall rule stored in policy database 206 may state that any incoming (going into the tenant network) traffic flow with a destination IP address of 192.168.0.x should be dropped, or any incoming traffic flow with a destination IP address of 192.168.0.y should be allowed. In another example, a firewall rule may state that any outgoing traffic that has a source IP address of 10.10.1.x should be allowed. As a result, if a received initial packet of the traffic flow has a destination address of 192.168.0.x, 192.168.0.y, or 10.10.1.x, security-policy checking mechanism 204 will determine that a security rule has been triggered and identify the corresponding firewall rule. Note that, in this disclosure, a traffic flow may refer to a sequence of packets from a particular source to a particular destination. More specifically, a flow can be identified by a unique combination of source and destination addresses and port numbers, together with a transport protocol (such as TCP or UDP), also known as the five-tuple for a TCP or UDP connection. For TCP, a traffic flow may end with an exchange of FIN and ACK packets between the source and the destination, or with a timeout.

In response to a determination by policy checking mechanism 204 that a policy has been triggered, traffic-parameter determination mechanism 208 determines the next/previous hop (either physical or virtual) traffic parameter for the packet. For incoming traffic, traffic-parameter determination mechanism 208 determines possible changes of traffic parameters when the packet arrives at the next hop node (which sometimes may involve NAT) within the tenant network. In the example shown in FIG. 1, before an incoming packet reaches a load balancer at virtual edge 110, edge appliance 108 performs NAT, which modifies the destination address. For outgoing traffic, traffic-parameter determination mechanism 208 determines the traffic parameters of the flow at the previous hop. Note that a reverse NAT lookup may be needed to determine the original traffic parameters at the previous hop if NAT occurs between edge appliance 200 and the previous hop. In the example shown in FIG. 1, due to the NAT at edge appliance 108, the source address of a packet forwarded from virtual edge 110 is modified (from an internal address of the load balancer to an external IP address that maps to the internal load balancer by NAT). Hence, to determine the source address of the packet at virtual edge 110, a reverse NAT lookup is needed. Note that, because edge appliance 200 is the one that performs the address translation, it has the knowledge of the traffic parameters at the next/previous hop.

Policy translator 210 is responsible for translating the statement of the identified security policy that is triggered by the received initial packet of a traffic flow to reflect changes in traffic parameters. In some embodiments, such a translation is based on the output of traffic-parameter determination mechanism 208, which can be a NAT outcome or an outcome of a reverse NAT lookup. The translated policy statement is then forwarded by policy-forwarding mechanism 212 to the next/previous hop. Note that, because the translated policy statement reflects local traffic parameters for this particular traffic flow, it is now possible to enforce the policy for this traffic flow at the next/previous hop using the translated policy statement. After processing the initial packet, edge appliance 200 no longer needs to perform policy checks for other packets in the same traffic flow because the policy enforcement task for this flow has been offloaded to the next/previous hop. In addition, once the translated policy statement is forwarded to the next/previous hop, edge appliance 200 can act as a pass-through device for the current traffic flow. More specifically, once edge appliance 200 identifies (based on traffic parameters) an incoming packet belonging to a known flow with its related policy forwarded, edge appliance 200 allows the packet to pass through. This arrangement can significantly reduce the delay at edge appliance 200 and increase traffic throughput for the tenant network. In some embodiments, edge appliance 200 may maintain a table that indicates which traffic flow has been checked previously, and allow a flow to pass through if it matches an entry in the table. In one embodiment, edge appliance 200 monitors the end of the traffic flow, and deletes a corresponding entry in the table in response to the end of the flow. As a result, policy checking mechanism 204 resumes the checking of the policies for packets with identical traffic parameters. The end of the traffic flow may result from of receiving a FIN packet or a timeout.

For example, if policy checking mechanism 204 determines that an initial packet of an incoming traffic flow triggers a firewall rule, which states that traffic flow with a destination IP address of 192.168.0.x should be dropped, traffic-parameter determination mechanism 208 will determine the traffic parameters of the received flow at the next hop, which may be an intermediate node. In one embodiment, the traffic parameters at the next hop may be affected by a NAT. Based on the current NAT setting, the destination IP address of the received packet will be mapped to 10.10.1.x. Accordingly, policy translator 210 translates this particular policy statement based on the NAT mapping. The translated policy statement now states that traffic flow with a destination IP address of 10.10.1.x should be dropped. Policy-forwarding mechanism 212 then forwards the translated policy statement to the next hop, thus allowing the next hop node to enforce the policy using the translated policy statement. Note that, because all packets within the current flow have their destination address changed by the NAT, the translated policy will apply to all these packets. The process of forwarding translated policy statements may be a cascaded process where each node translates the policy statement and forwards the translated policy statement to its next hop until an appropriate policy statement is received, for example, by a virtual NIC (network interface card) at the destination node. The virtual NIC can then act as a PEP node to enforce the security policy based on the received security policy statement, which has been translated one or more times to reflect changes to the destination IP address.

Similarly, if security-policy checking mechanism 204 determines that an initial packet of an outgoing traffic flow triggers a firewall rule, which states that traffic flow with a source IP address of 192.168.1.x should be allowed, traffic-parameter determination mechanism 208 will determine the traffic parameters of the received flow at the previous hop, which may be an intermediate node. In one embodiment, the traffic parameters at the previous hop may be affected by a NAT situated between edge appliance 200 and the previous hop. Hence, a reverse lookup of route and NAT rules are needed to identify the source address of the packet when the packet is at the previous hop. More specifically, the NAT translation table maintained by edge appliance 200 will be queried to identify the source address (10.10.1.x) of the packet at the previous hop. Various methods can be used to perform the reverse lookup. In one embodiment, such a reverse lookup can be performed by a centralized node that maintains the full datacenter configuration. Accordingly, policy translator 210 translates this particular policy statement based on the reverse NAT lookup. The translated policy statement now states that traffic flow with a source IP address of 10.10.1.x should be allowed. Policy-forwarding mechanism 212 then forwards the translated policy statement back to the previous hop, thus allowing the node at the previous hop to enforce the policy using the translated policy statement. Note that, because all packets within the current flow have their source address as 10.10.1.x, once in receipt of the policy statement, the previous hop can apply the policy to all packets remaining in the flow. Any packets arrive at the edge appliance prior to the previous hop receiving the translated policy statement and starting to enforce the policy are still processed by edge appliance 200. Like the previous example, this policy statement forwarding (or pushing back) process can be a cascaded process where each node forwards the policy to its previous hop until the security policy statement is pushed all the way back to the originating node of the traffic flow. Each time the policy statement traverse an intermediate node implementing NAT, a reverse NAT lookup will be performed. Note that before the end of the traffic flow, each NAT'ed node is required to maintain the translation table. By pushing back the PEP all the way to the originating node of the traffic flow, or to an intermediate node that is closest to the traffic originator, embodiments of the present invention can enhance the effectiveness of a firewall (denied traffic flow will be dropped immediately after its initiation) and ultimately increase traffic throughput.

Figure 3:
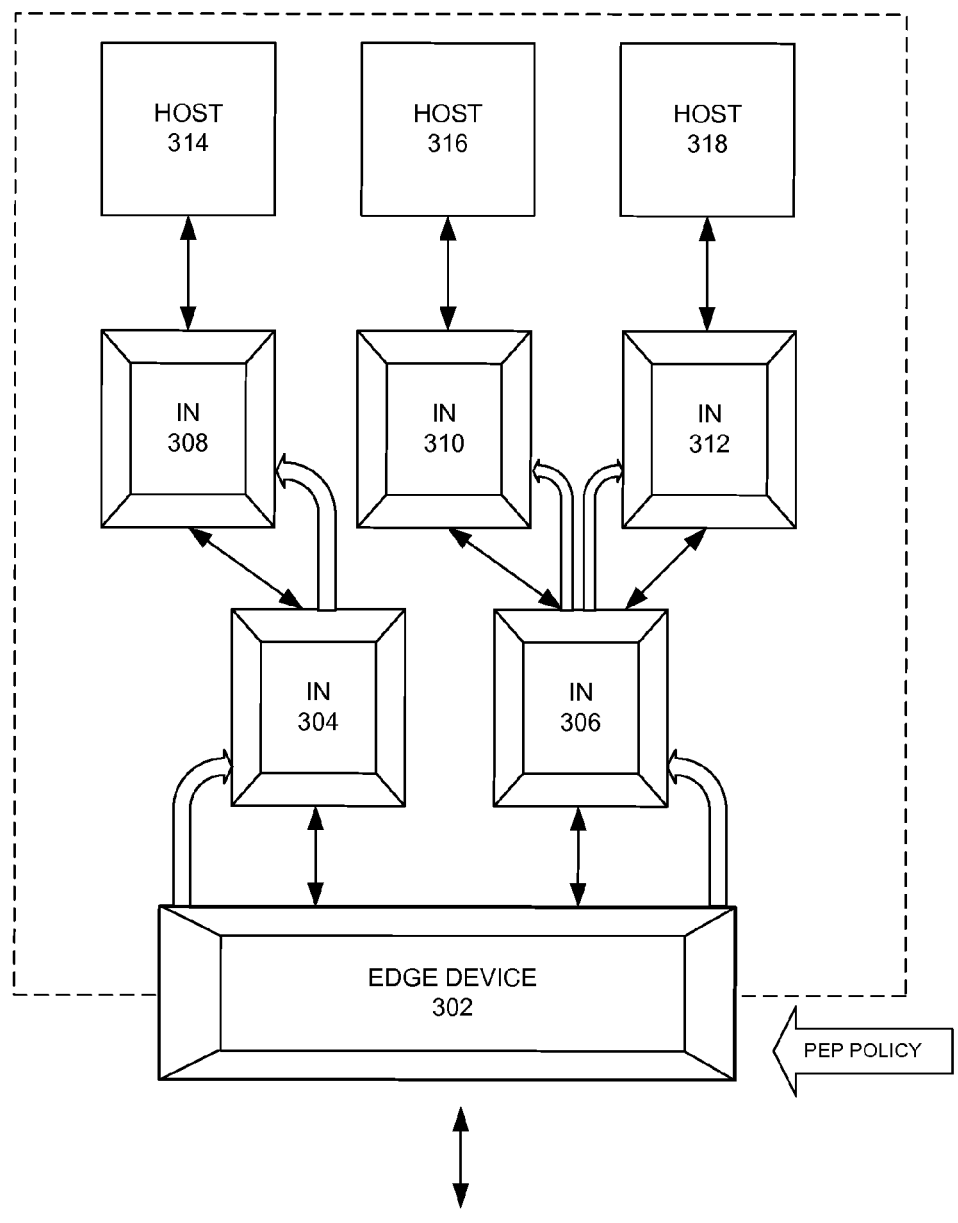
FIG. 3 presents a diagram illustrating an exemplary network that implements distributed policy enforcement.

FIG. 3 presents a diagram illustrating an exemplary network that implements distributed policy enforcement. In FIG. 3, network 300 includes an edge device 302, a number of hosts (such as hosts 314, 316, and 318), and a number of intermediate nodes (such as intermediate nodes 304, 306, 308, 310, and 312).

Edge device 302 maintains a number of policies that control the traffic flows in and out of network 300; the policies include but are not limited to: security policies (such as firewall, access control, etc.), quality of service (QoS) policies, and other policies that may be implemented by the network administration.

Traffic flows between the hosts and edge device 302 may traverse multiple intermediate nodes (INs). For example, a traffic flow originating from host 314 may arrive at edge device 302 by traversing intermediate nodes 308 and 304. Note that each intermediate node may perform certain operations that alter the parameters of the traffic flow. For example, both intermediate nodes 308 and 304 may perform NAT, either for load balancing or security purposes. As a result, the traffic parameters, which may include the source address of the flow, are modified at least twice. Given the amount of traffic flowing in and out of network 300, relying solely on edge device 302 as a single PEP can result in limited traffic throughput. It is desirable to distribute the policy enforcement responsibility among the intermediate nodes or the hosts.

Note that the policy statement maintained at edge device 302 identifies traffic flows between the hosts and edge device 302 based on external addresses of the hosts. Consequently, these policy statements cannot be used directly by the intermediate nodes or the hosts for policy enforcement. To solve this problem, in embodiments of the present invention, when an initial packet of a traffic flow (such as a traffic flow originating from host 314) hits edge device 302, edge device 302 determines whether the flow triggers a policy, such as a firewall rule. If so, a reverse source route lookup is performed by edge device 302 to determine the source route of the flow. In some embodiments, the reverse source route lookup may involve a reverse NAT lookup, such as lookup of a NAT rule in the NAT translation table. Based on the outcome of the reverse source route lookup, edge device 302 identifies that IN 304 is the previous intermediate node that is traversed by the packet. Edge device 302 can further determine the traffic parameters associated with the flow when the packet arrived at IN 304. For example, if NAT occurred between IN 304 and edge device 302, edge device 302 can look up the corresponding NAT rule to determine the source address of the packet before the NAT. Using the same NAT rule, edge device 302 can translate the policy statement. The translated policy statement is now relevant to the source address of the flow at IN 304. Edge device 302 further sends the translated policy statement to IN 304 to allow IN 304 to enforce the policy to the flow accordingly. IN 304 may choose to enforce the policy based on the translated policy statement or continue to push the enforcement of the policy upstream to its previous hop. For example, IN 304 may also perform a reverse lookup to identify its previous node, which is IN 308, and traffic parameters of the flow at IN 308. In one embodiment, a centralized node that maintains the full datacenter configuration may perform such reverse lookup to identify the previous node. Alternatively, IN 304 can determine the previous node of the traffic flow based on the MAC address from which the packet is forwarded. Similar to edge device 302, IN 304 may translate the policy statement received from edge device 302 to reflect possible changes of the traffic parameters, and send the translated policy statement to its previous hop, IN 308, which is a node adjacent to host 314. In some embodiments, the intermediate node that is closest to the traffic originating point is often selected as the PEP. In some embodiments, the policy can be pushed all the way to the traffic originating point, in this case host 314, which enforces the policy locally. Note that by offloading policy enforcement tasks to intermediate nodes, edge device 302 can now act as a pass-through to the rest of the flow, thus significantly improving throughput at edge device 302. Moreover, by enforcing policy at a point closest to the traffic originating point, embodiments of the present invention reduce network clustering because forbidden traffic flows are dropped before they traverse multiple hops.

When traffic flows in another direction, from edge device 302 to one of the hosts, the policy can be pushed forward to the next hop to allow the intermediate node at the next hop to perform policy enforcement. More particularly, when edge device 302 routes an initial packet of a flow to its next hop, it determines traffic parameters, such as destination address, of the flow at the next hop node. Using the same information, edge device 302 can translate the statement of a triggered policy to reflect any possible changes in traffic parameters, such as modified destination address of the flow. The translated policy statement can be sent to the next hop, which can choose to continue forwarding of the policy or enforce the policy locally. In FIG. 3, the arrows show the direction of traffic flows (in and out of network 300), whereas the hollowed arrows show the direction of the policy forwarding. When the traffic flows out of network 300, the direction of the policy forwarding is opposite to the direction of the traffic flow, whereas when the traffic flows into network 300, the direction of the policy forwarding is the same as the direction of the traffic flow.

Figure 4A:
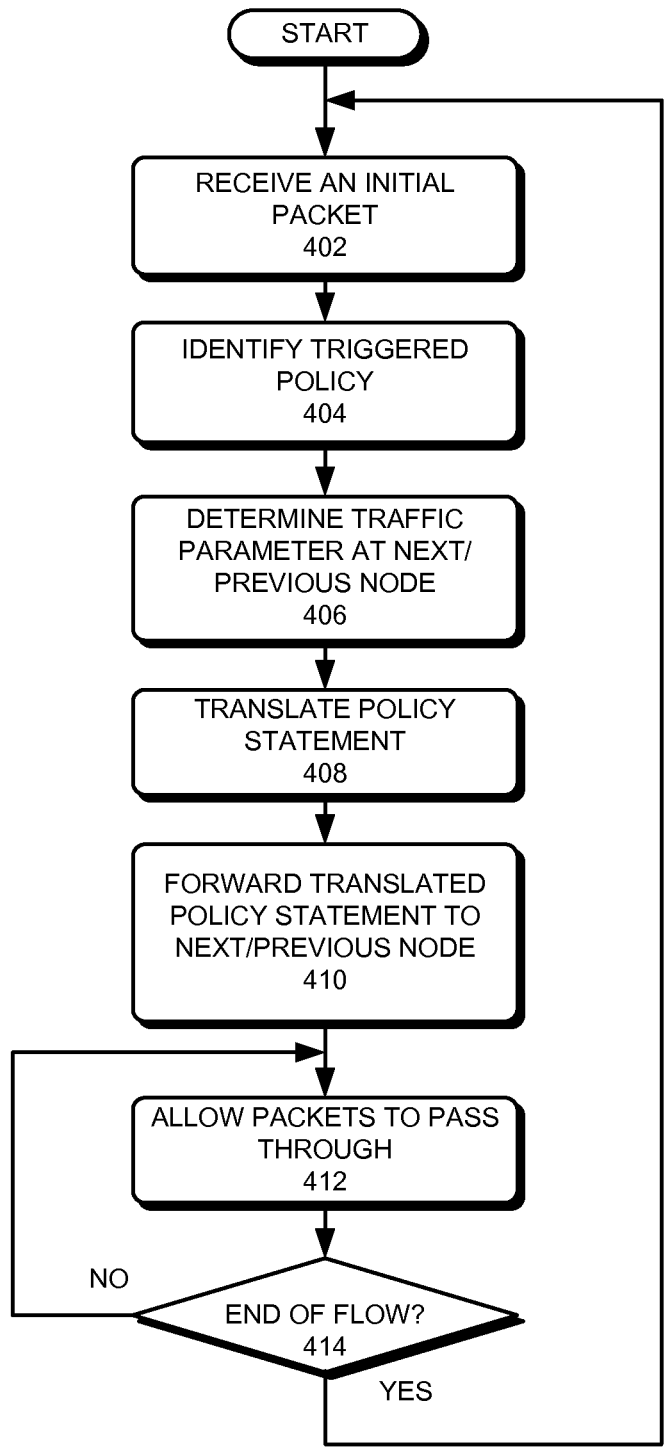
FIG. 4A presents a flowchart illustrating an exemplary policy-forwarding process at an edge node.

FIG. 4A presents a flowchart illustrating an exemplary policy-forwarding process at an edge node. During operation, a network edge node receives an initial packet of a traffic flow (operation 402), and identifies an edge policy that is triggered by the packet based on the traffic parameter of the flow (operation 404). In some embodiments, the policy may include security policies and QoS policies. In one embodiment, the traffic parameters may include the 5-tuple (source IP address, source port number, destination IP address, destination port number, and protocol type) that identifies a TCP connection.

In response to identifying the policy being triggered, the system determines the traffic parameters of the flow at the next or previous hop (operation 406). Note that, if the traffic flow direction is going into the network, the edge node determines the traffic parameters of the flow at the next hop node by performing a reverse route lookup; otherwise, the edge node determines the traffic parameters of the flow at the previous hop node based on the current routing decision. Based on the determined traffic parameters, the edge node translates the policy statement (operation 408), and forwards the translated policy statement to the determined next or previous hop node (operation 410). Subsequent to forwarding the policy statement, the edge node allows the remaining packets of the traffic flow to pass through (operation 412). The edge node then determines whether the traffic flow is ended (operation 414). In some embodiments, the end of the current traffic flow may be indicated by a FIN packet or by a timeout. If not, the edge node continues to allow packets within the same flow to pass through (operation 412). Otherwise, the edge node returns to operation 402.

Figure 4B:
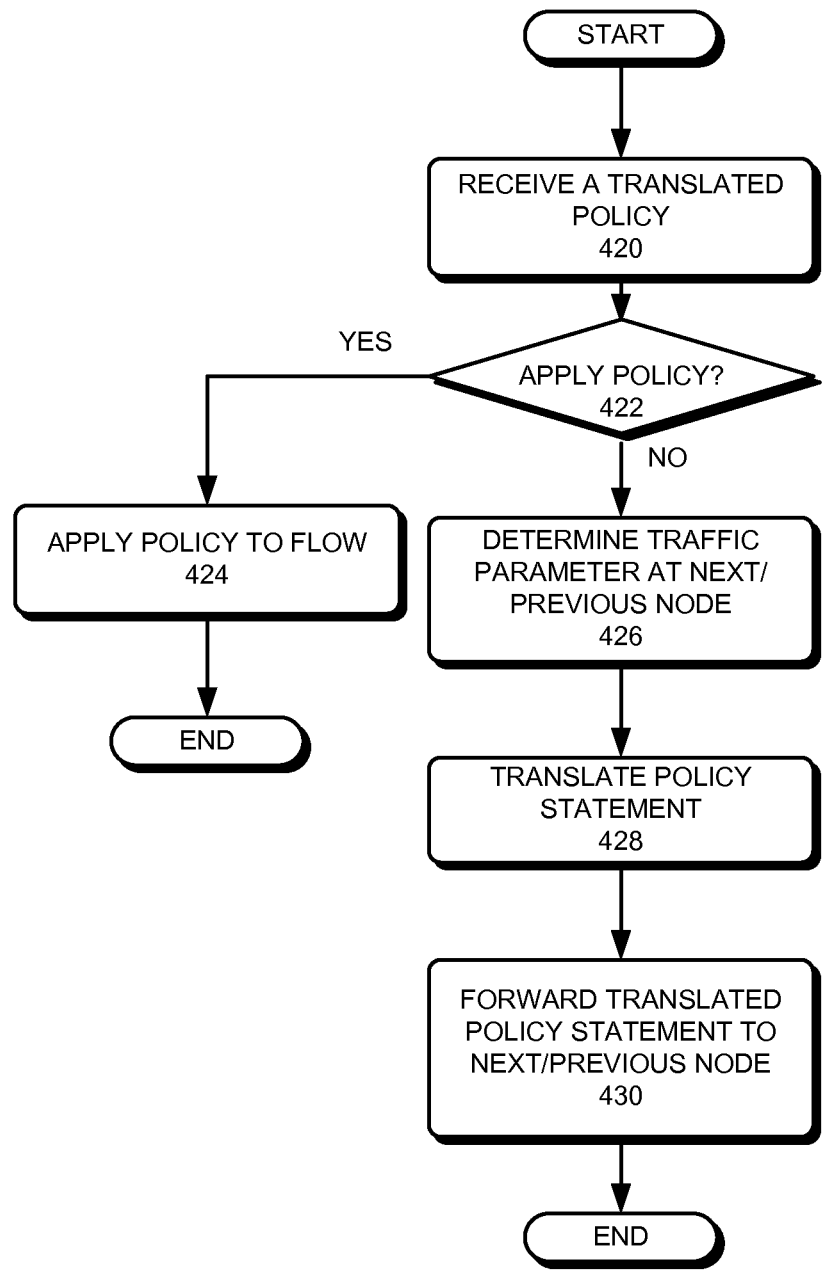
FIG. 4B presents a flowchart illustrating an exemplary policy-forwarding process at an intermediate node.

FIG. 4B presents a flowchart illustrating an exemplary policy-forwarding process at an intermediate node. During operation, the intermediate node receives a policy statement associated with a flow (operation 420), and determines whether to apply the policy locally (operation 422). Note that various factors may be considered when the intermediate node makes such decision. For example, if the intermediate node is a node that is closest to the destination or is a designated PEP node, the intermediate node may choose to apply the policy locally. If so, the intermediate node applies the policy to all packets within the flow (operation 424). Otherwise, the intermediate node determines traffic parameters of the flow at the next or previous hop (operation 426), translates the received policy statement based on the determined traffic parameters (operation 428), and forwards the translated policy statement to the next/previous hop (operation 430).

Figure 5:
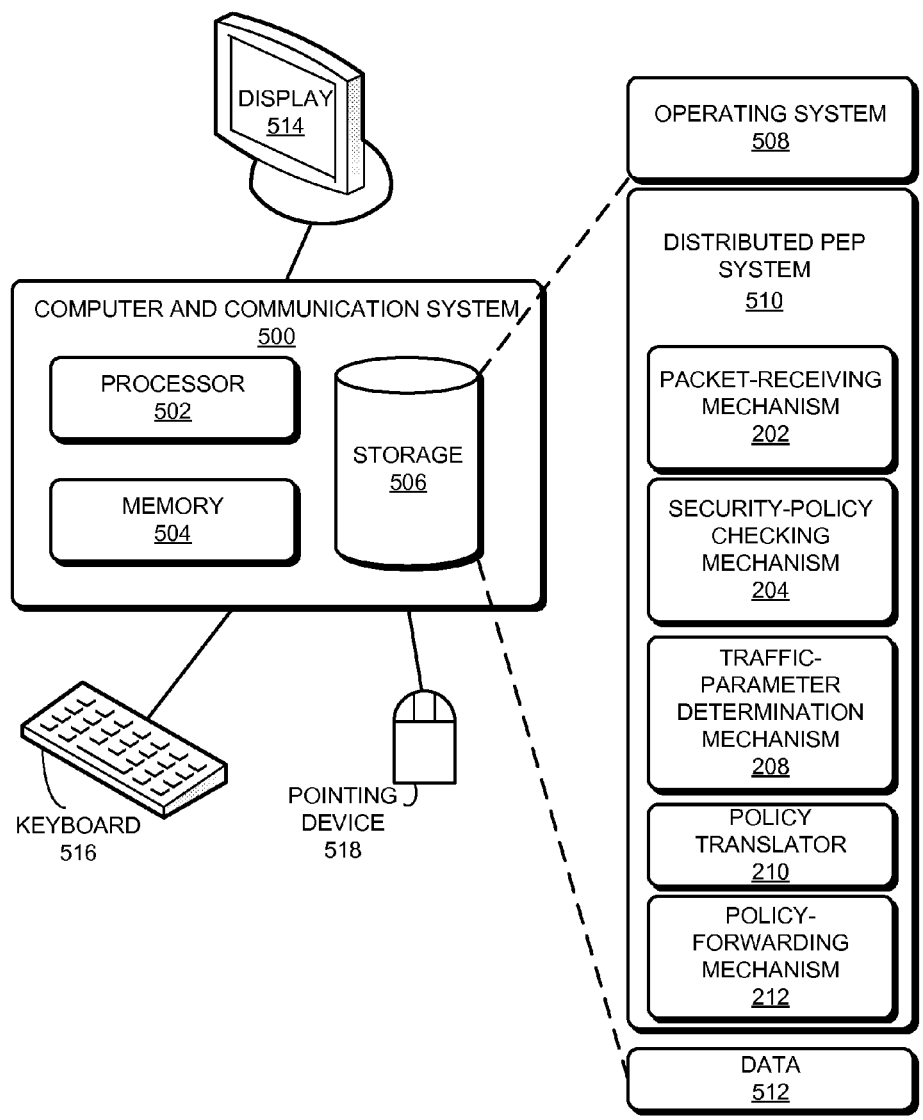
FIG. 5 illustrates an exemplary computer system for distributed policy enforcement.

FIG. 5 illustrates an exemplary computer system for distributed policy enforcement. In one embodiment, a computer and communication system 500 includes a processor 502, a memory 504, and a storage device 506. Memory 504 can include a volatile memory (e.g., RAM) that serves as a managed memory, and can be used to store one or more memory pools. Furthermore, computer system 500 can be coupled to a display device 514, a keyboard 516, and a pointing device 518. Storage device 506 can store an operating system 508, a distributed PEP system 510, and data 512.

Distributed policy-enforcement system 510 can include instructions, which when executed by computer system 500 can cause computer system 500 to perform methods and/or processes described in this disclosure. Specifically, distributed policy-enforcement system 510 may include instructions for receiving communication packets (packet-receiving mechanism 202). Further, distributed policy-enforcement system 510 can include instructions for checking security policies (security-policy checking mechanism 204) and instructions for determining traffic parameters at the next/previous hop (traffic-parameter determination mechanism 208). Distributed policy-enforcement system 510 can also include instructions for translating security policy statement (policy translator 210) and instructions for forwarding the translated policy statement to the next/previous hop (policy-forwarding mechanism 212).

Data 512 can include any data that is required as input or that is generated as output by the methods and/or processes described in this disclosure. Specifically, data 512 can store security policies.

Note that, although this disclosure uses firewall rules as examples, the scope of the present invention is not limited to this particular implementation. Other types of policies, such as access policies or QoS policies, can also be enforced using this distributed PEP system. Moreover, in addition to multi-tenant datacenters, as used as an example in this disclosure, other types of network that rely on a single PEP to enforce policies can also implement the method and system described in this disclosure.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for distributed policy enforcement in a network, comprising:
    receiving, at an edge device, an initial packet for a traffic flow going out of the network;
    determining that the initial packet triggers an edge policy maintained at the edge device;
    performing a reverse lookup to identify at least: an intermediate node that is previously traversed by the initial packet and traffic parameters associated with the initial packet at the identified intermediate node;
    translating the edge policy based on the traffic parameters at the identified intermediate node; and
    forwarding the translated edge policy to the identified intermediate node, thereby facilitating the identified intermediate node in applying the edge policy to the traffic flow.

2. The method of claim 1, wherein the network includes a tenant network in a multi-tenant datacenter.

3. The method of claim 1, wherein the reverse lookup involves at least one of:
    identifying a network address translation (NAT) rule; and
    looking up a NAT translation table.

4. The method of claim 1, wherein the edge policy includes one or more of:
    firewall rules;
    access-control policies; and
    quality of service policies.

5. The method of claim 1, further comprising:
    determining that the intermediate node is not immediately adjacent to a destination of the initial packet; and
    forwarding the translated edge policy to a second intermediate node that is closer to the destination than the intermediate node.

6. The method of claim 1, further comprising allowing remaining packets of the traffic flow to pass through the edge device.

7. The method of claim 1, further comprising:
    receiving an incoming packet; and
    forwarding a second edge policy associated with the incoming packet to a next-hop node.

8. The method of claim 7, further comprising:
    identifying changes to traffic parameters associated with the incoming packet before the incoming packet reaches the next-hop node; and
    translating the second edge policy based on the identified changes.

9. The method of claim 1, wherein the traffic parameters include one or more of:
    a source address;
    a destination address;
    a source port number; and
    a destination port number.

10. A non-transitory computer-readable storage medium storing instructions that when executed by a computer cause the computer to perform a method for distributed policy enforcement in a network, the method comprising:
    receiving, at an edge device, an initial packet for a traffic flow going out of the network;
    determining that the initial packet triggers an edge policy maintained at the edge device;
    performing a reverse lookup to identify at least: an intermediate node that is previously traversed by the initial packet and traffic parameters associated with the initial packet at the identified intermediate node;
    translating the edge policy based on the traffic parameters at the identified intermediate node; and
    forwarding the translated edge policy to the identified intermediate node, thereby facilitating the identified intermediate node in applying the edge policy to the traffic flow.

11. The non-transitory computer-readable storage medium of claim 10, wherein the network includes a tenant network in a multi-tenant datacenter.

12. The non-transitory computer-readable storage medium of claim 10, wherein the reverse lookup involves at least one of:
    identifying a network address translation (NAT) rule; and
    looking up a NAT translation table.

13. The non-transitory computer-readable storage medium of claim 10, wherein the edge policy includes one or more of:
   firewall rules;
   access-control policies; and
   quality of service policies.

14. The non-transitory computer-readable storage medium of claim 10, wherein the method further comprises:
   determining that the intermediate node is not immediately adjacent to a destination of the initial packet; and
   forwarding the translated edge policy to a second intermediate node that is closer to the destination than the intermediate node.

15. The non-transitory computer-readable storage medium of claim 10, wherein the method further comprises allowing remaining packets of the traffic flow to pass through the edge device.

16. The non-transitory computer-readable storage medium of claim 10, wherein the method further comprises:
   receiving an incoming packet;
   forwarding a second edge policy associated with the incoming packet to a next-hop node.

17. The non-transitory computer-readable storage medium of claim 16, wherein the method further comprises:
   identifying changes to traffic parameters associated with the incoming packet before the incoming packet reaches the next-hop node; and
   translating the second edge policy based on the identified changes.

18. The non-transitory computer-readable storage medium of claim 10, wherein the traffic parameters include one or more of:
   a source address;
   a destination address;
   a source port number; and
   a destination port number.

19. An edge device for distributed policy enforcement in a network, comprising:
   a receiving mechanism configured to receive an initial packet for a traffic flow going out of the network;
   a determination mechanism configured to determining that the initial packet triggers an edge policy maintained at the edge device;
   a lookup mechanism configured to perform a reverse lookup to identify at least: an intermediate node that is previously traversed by the initial packet and traffic parameters associated with the initial packet at the identified intermediate node;
   a policy translator configured to translate the edge policy based on the traffic parameters at the identified intermediate node; and
   a policy-forwarding mechanism configured to forward the translated edge policy to the identified intermediate node, thereby facilitating the identified intermediate node in applying the edge policy to the traffic flow.

20. The edge device of claim 19, wherein while performing the reverse lookup, the lookup mechanism is configured to perform one of:
   identifying a network address translation (NAT) rule; and
   looking up a NAT translation table.

* * * * *